United States Patent Office 3,114,678
Patented Dec. 17, 1963

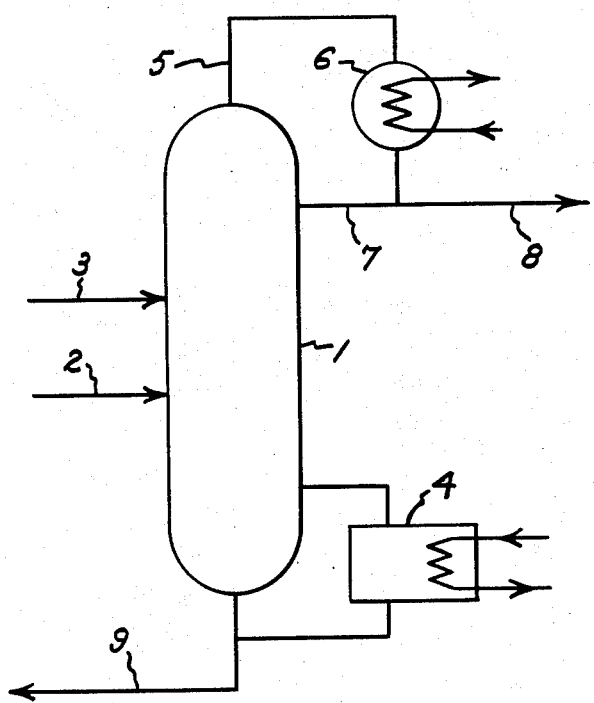
Inventors:
Samuel O. Megantz,
George M. Hopkins,
by Robert S. Friedman
Their Attorney.

3,114,678
METHOD FOR SEPARATING CHLOROSILANES FROM MIXTURES THEREOF
Samuel O. Megantz, Burnt Hills, and George M. Hopkins, Ballston Lake, N.Y., assignors to General Electric Company, a corporation of New York
Filed Aug. 11, 1961, Ser. No. 130,743
4 Claims. (Cl. 202—39.5)

The present invention relates to a method for separating trimethylchlorosilane from chlorosilane mixtures comprising silicon tetrachloride and trimethylchlorosilane. More particularly, the present invention provides for the production of substantially pure trimethylchlorosilane from chlorosilane mixtures comprising trimethylchlorosilane and silicon tetrachloride, by distilling a chlorosilane mixture comprising trimethylchlorosilane silicon tetrachloride and methyldichlorosilane, and separating therefrom, as an overhead product, a mixture consisting essentially of silicon tetrachloride and methyldichlorosilane.

Numerous methods have been devised to separate the various chlorosilane components from the crude mixture of chlorosilanes resulting from the passage of methyl chloride through a heated powdered mixture of silicon and metal catalyst. Fractional distillation, for example, has been successfully employed to rectify most of the liquid products comprising the crude chlorosilane mixture due to differences in boiling points of the various components. Prior to the present invention, however, certain particularly useful chlorosilanes present in the crude chlorosilane mixture such as trimethylchlorosilane could not be satisfactorily separated by conventional distillation methods. Trimethylchlorosilane, as is generally known, is difficult to recover from the aforesaid crude chlorosilane mixture by conventional distillation methods in substantially pure form, because it is invariably associated therein with silicon tetrachloride and these materials have approximately the same boiling point. In addition, silicon tetrachloride and trimethylchlorosilane form a constant boiling azeotrope when mixed together, which boils at a different temperature than either of the component members.

In particular situations, however, a satisfactory separation of silicon tetrachloride or trimethylchlorosilane from a mixture containing both components can be effected. For example, in view of the fact that the silicon tetrachloride-trimethylchlorosilane azeotrope, comprised of about 65 percent by weight of silicon tetrachloride, boils at a lower temperature than either component, the removal of the azeotrope by distillation of the mixture effectively provides for the removal of a proportionate amount of either component. In view of economic considerations, however, the separation of silicon tetrachloride or trimethylchlorosilane by distillation of a chlorosilane mixture containing these materials, through the removal of the azeotrope is obviously limited to mixtures having only contaminating amounts of either component. Were this distillation method, for example involving the removal of the azeotrope, to be applied to effect the separation of trimethylchlorosilane from the chlorosilane mixture obtained by the passage of methylchloride through a heated powdered mixture of silicon and catalyst, undesirable losses of trimethylchlorosilane would result. In addition to physical methods of separation, chemical procedures are also available to effect the separation of silicon tetrachloride and trimethylchlorosilane from each other when present together in chlorosilane mixtures such as shown in Sauer Patent 2,381,139, Di Giorgio et al. 2,485,366 relating to resolving the silicon tetrachloride-dimethylchlorosilane azeotrope. These methods, however, are also limited, because the use of expensive chemicals and elaborate separation procedures are required.

The present invention is based on the discovery that a substantially pure trimethylchlorosilane bottoms product can be produced in accordance with conventional distillation methods from a chlorosilane mixture, including the aforesaid crude chlorosilane mixtures containing silicon tetrachloride and trimethylchlorosilane, by distilling a mixture comprising silicon tetrachloride and trimethylchlorosilane together with methyldichlorosilane and separating a mixture consisting essentially of silicon tetrachloride and methyldichlorosilane as an overhead product.

Although the reason why a separation of silicon tetrachloride from a mixture of chlorosilanes comprising silicon tetrachloride and trimethylchlorosilane can be effected in accordance with the practice of the present invention is not completely understood, a possible explanation is that the methyldicholorosilane acts like an extractive distillation agent for the silicon tetrachloride. As a result, the vapor pressure of the trimethylchlorosilane is presumably depressed, in accordance with conventional extractive distillation theory providing for the ready removal of the trimethylchlorosilane as a bottoms product.

In accordance with the present invention, there is provided a process for the separation of silicon tetrachloride from a chlorosilane mixture comprising silicon tetrachloride and trimethylchlorosilane, and preferably a chlorosilane mixture comprising silicon tetrachloride and trimethylchlorosilane, having at least a major proportion by weight of trimethylchlorosilane with respect to the silicon tetrachloride, comprising (1) forming a mixture of chlorosilanes comprising silicon tetrachloride, trimethylchlorosilane and methyldichlorosilane, where the methyldichlorosilane is utilized in a weight proportion of at least 2 parts of methyldichlorosilane per part of silicon tetrachloride, (2) distilling the mixture of (1), and (3) continuously separating as an overhead product a mixture consisting essentially of silicon tetrachloride and methyldichlorosilane.

In the practice of the invention, a mixture of chlorosilanes comprising silicon tetrachloride, trimethylchlorosilane and methyldichlorosilane is distilled to provide for the production of a bottoms product comprising trimethylchlorosilane free of silicon tetrachloride by the removal of an overhead product consisting essentially of silicon tetrachloride and methyldichlorosilane.

The practice of the present invention is further shown in the drawing directed to the separation of silicon tetrachloride from a mixture of chlorosilanes containing silicon tetrachloride and trimethylchlorosilane by the use of methyldichlorosilane.

There is shown a conventional distillation column 1 to which there is fed a mixture of chlorosilanes through line 3. In instances where it is desirable to add methyldichlorosilane to the chlorosilane feed, methyldichlorosilane can be fed into the column at line 2. Chlorosilane is vaporized by a reboiler at 4, and the vapors are withdrawn overhead through line 5, and pass through a condenser 6, from which overhead product can be withdrawn at 8, or returned to the column by reflux through line 7. At 9, there is shown a line for the separation of bottoms product, which can be subjected to further distillation if desired.

Although the distillation of the above described mixture of chlorosilanes comprising silicon tetrachloride, trimethylchlorosilane and methyldichlorosilane is preferably accomplished in a continuous manner, in certain situations a modified batchwise procedure can be also advantageously employed. For example, a batchwise process involving the continuous introduction of methyldichlorosilane into a batch of a mixture comprising silicon tetrachloride and trimethylchlorosilane, and the continuous removal of an overhead product of a mixture consisting essentially of methyldichlorosilane and silicon tetrachloride can also result in the production of a trimethylchlorosilane product free of silicon tetrachloride. The aforedescribed modified batch process is particularly preferred, moreover, when resolving a mixture of chlorosilanes comprising silicon tetrachloride and trimethylchlorosilane, where the silicon tetrachloride is present in at least a major proportion by weight with respect to the trimethylchlorosilane.

Generally, chlorosilane mixtures comprising silicon tetrachloride, trimethylchlorosilane, methyldichlorosilane, can be fed into a standard distillation column in accordance with conventional procedures, or the respective components can be added separately at various points along the column thereto whereby the chlorosilane mixture is formed within the column and distilled thereafter in accordance with the practice of the present invention. The chlorosilane mixture that is distilled in accordance with the practice of the invention can contain in addition to silicon tetrachloride, trimethylchlorosilane and methyldichlorosilane, major proportions of other silanes such as methyltrichlorosilane, dimethyldichlorosilane, trichlorosilane, etc. The latter silanes, even though present in major amounts in the chlorosilane mixture that is distilled have been found to exert little or no influence on the ability of the methyldichlorosilane to effect the removal of the silicon tetrachloride from the chlorosilane mixture.

As a practical matter, in view of the inherent limitations commonly present in conventional distillation facilities, such as column efficiency, size, etc., it is preferred to practice the invention with chlorosilane mixtures comprising silicon tetrachloride, trimethylchlorosilanes and methyldichlorosilane, where the trimethylchlorosilane is present in at least a major proportion by weight with respect to the silicon tetrachloride and the methyldichlorosilane is present with respect to the silicon tetrachloride in a weight ratio of at least 2 parts of methyldichlorosilane per part of silicon tetrachloride. However, it is to be understood that in accordance with extractive distillation theory, any mixture of silicon tetrachloride and trimethylchlorosilane having the respective components in any proportion by weight with respect to each other, can be resolved in accordance with the practice of the invention. Accordingly, depending upon the amount of silicon tetrachloride present in the mixture of chlorosilane, the amount of methyldichlorosilane that is required to produce a bottoms product free of silicon tetrachloride can vary widely.

Experience has shown that satisfactory removal of silicon tetrachloride from a mixture of chlorosilanes comprising silicon tetrachloride, trimethylchlorosilane and methyldichlorosilane can be achieved by standard distillation methods to provide for the production of a bottoms product comprising trimethylchlorosilane free of silicon tetrachloride by separating as an overhead product a mixture consisting essentially of silicon tetrachloride and methyldichlorosilane. It is preferred, moreover, to maintain a weight ratio of at least about 2 to 6 parts of methyldichlorosilane per part of silicon tetrachloride in the overhead product. In order to insure the removal of the last traces of silicon tetrachloride in the bottoms product, moreover, particularly when rectifying chlorosilane mixtures comprising a major proportion of trimethylchlorosilane, minor amounts of trimethylchlorosilane such as for example, up to a proportion by weight of one or two times the weight of silicon tetrachloride in the overhead product or higher can be removed also, if desired, depending upon such factors as the amount of methyldichlorosilane used in the distillation, efficiency of the column employed, the rate at which the separation is effected, etc. Even though in certain situations, due to the aforementioned factors, minor losses of trimethylchlorosilanes are experienced, a separation of the silicon tetrachloride from a chlorosilane mixture without the aid of methyldichlorosilane would result in proportionately much higher losses of trimethylchlorosilane in the overhead product. Experience has shown, for example, that if a distillation of a chlorosilane mixture comprising silicon tetrachloride and trimethylchlorosilane is performed to provide for the production of a silicon tetrachloride free bottoms without the benefits of methyldichlorosilane, that a loss in the overhead product of 3 to 5 times the amount of trimethylchlorosilane compared to the loss in the overhead attained with methyldichlorosilane under comparable conditions would not be unusual.

In order that those skilled in the art will be better able to understand the practice of the present invention, the following examples are given by way of illustration and not by limitation. All parts are by weight.

EXAMPLE 1

There are continuously fed into a 70 tray bubble cap distillation column at a pressure of 15 pounds p.s.i. and a temperature of about 69° C. at the top, about 1525 parts per hour of a chlorosilane mixture consisting of about 53.7% of trimethylchlorosilane, about 5.4% of silicon tetrachloride, about 37.4% of methyltrichlorosilane, about 3.5% of dimethyldichlorosilane along with about 575 parts per hour of methyldichlorosilane. There was continuously separated as an overhead product at a rate of about 750 parts per hour a mixture of chlorosilanes consisting of about 76.9% methyldichlorosilane, about 10.5% trimethylchlorosilane, about 10.9% silicon tetrachloride and about 2% of silanes, such as trichlorosilane, tetramethylsilane, etc., and a bottoms product that was free of silicon tetrachloride was separated at a rate of about 1350 parts per hour consisting of about 52.8% trimethylchlorosilane, about 42.1% methyltrichlorosilane, and about 4% of dimethyldichlorosilane. The bottoms product was then redistilled and the trimethylchlorosilane, as the lowest boiling component, was readily separated therefrom.

The above procedure is repeated except that no methyldichlorosilane is fed into the distillation column along with the above chlorosilane mixture and the temperature at the top of the column is about 80° C. The feed rate is maintained at 1525 parts per hour and an overhead product is separated at a rate of about 175 parts per hour consisting of about 39% of silicon tetrachloride, about 53.5% of trimethylchlorosilane and about 7.5% silanes, such as trichlorosilane, tetramethylsilane, etc., while about 1350 parts per hour of bottom is separated consisting of about 52.8% trimethylchlorosilane, about 1% silicon tetrachloride, about 42.1% of methyltrichlorosilane and about 3.9% of dimethyldichlorosilane.

The advantages realized in accordance with the practice of the present invention are clearly demonstrated by the above results. A bottoms product was recovered that was free of silicon tetrachloride resulting from the continuous distillation of a mixture of chlorosilane comprising silicon tetrachloride and trimethylchlorosilane when methyldichlorosilane was present in the mixture, which provided for the recovery thereafter of trimethylchlorosilane by standard continuous distillation procedure. However, when the same mixture of chlorosilanes was distilled following the same procedure in the absence of methyldichlorosilane, a bottoms product was produced that was contaminated with about 1% of silicon tetrachloride. Those skilled in the art would know that it would not be possible to recover uncontaminated trimethylchlorosilane by continuously distilling a bottoms product containing 1% silicon tetrachloride.

EXAMPLE 2

The effect of methyldichlorosilane on a binary mixture of 80 mole percent trimethylchlorosilane and 20 mole percent silicon tetrachloride was investigated. This mixture was refluxed at atmospheric pressure in a column having 14.8 theoretical plates. Increments of methyldichlorosilane were added to the binary feed and the composition of the overhead product was periodically analyzed after each increment was added. The following table shows the change in "α" which represents the change in the ratio in terms of volatility of silicon tetrachloride (Q) to trimethylchlorosilane (M) in the overhead product that results when the mole percent of the methyldichlorosilane (MH) in the overhead product increased. The ratio shown for 0 mole percent MH reflects the influence the lower boiling azeotrope has on the α of the Q-M mixture. An increase in the α of the overhead product is desirable, as it indicates that the ratio of Q to M is increasing. An increase in the Q to M ratio in the overhead product means that there is less trimethylchlorosilane being removed as overhead product.

Table

| Mole percent of MH: | α of Q/M |
|---|---|
| 0 | 1.107 |
| 44.9 | 1.126 |
| 55.7 | 1.152 |
| 71.9 | 1.157 |

Those skilled in the art would know that the above data clearly show that as the mole percent of methyldichlorosilane is increased in the overhead product that a proportionate increase in the amount of trimethylchlorosilane as bottoms product is being realized. This clearly demonstrates the value of utility of methyldichlorosilane as an extractive distillation agent for the separation of silicon tetrachloride and trimethylchlorosilane from mixtures thereof.

There is thus provided by the present invention a process for separating silicon tetrachloride from a chlorosilane mixture comprising silicon tetrachloride and trimethylchlorosilane. The present invention also provides a method for resolving the silicon tetrachloride-trimethylchlorosilane azeotrope whereby substantially pure silicon tetrachloride and substantially pure trimethylchlorosilane can be recovered.

While the foregoing examples have been limited to only a few of the very many variables within the scope of the present invention, it should be understood that the present invention relates broadly to the separation of silicon tetrachloride from chlorosilane mixtures comprising silicon tetrachloride, trimethylchlorosilane and methyldichlorosilanes by continuous or batch distillation of such chlorosilane mixtures, and the separation of an overhead product of a mixture consisting essentially of methyldichlorosilane and silicon tetrachloride.

What we claim as new and desire to secure by Letters Patent of the United States is:

1. A process for separating silicon tetrachloride from a chlorosilane mixture comprising silicon tetrachloride and trimethylchlorosilane involving the use of methyldichlorosilane comprising (1) distilling a mixture of chlorosilanes comprising silicon tetrachloride, trimethylchlorosilane and methyldichlorosilane where methyldichlorosilane is utilized in said mixture in a proportion of by weight of at least about 2 parts of methyldichlorosilane per part of silicon tetrachloride, (2) continuously separating as an overhead product a mixture comprising silicon tetrachloride and methyldichlorosilane, and (3) continuously separating as a bottoms product, a mixture comprising trimethylchlorosilane.

2. A process in accordance with claim 1 where methyldichlorosilane is continuously fed into a batch of a mixture of chlorosilanes comprising silicon tetrachloride and trimethylchlorosilane, and an overhead product comprising methyldichlorosilane and silicon tetrachloride is continuously separated therefrom.

3. A process in accordance with claim 1 where the trimethylchlorosilane in said mixture comprising silicon tetrachloride and trimethylchlorosilane is present in at least a major proportion by weight, with respect to the silicon tetrachloride.

4. A process for the separation of silicon tetrachloride from a chlorosilane mixture containing silicon tetrachloride, trimethylchlorosilane, methyltrichlorosilane, and dimethyldichlorosilane by the use of methyldichlorosilane, where the trimethylchlorosilane is present in said mixture in at least a major proportion by weight with respect to the silicon tetrachloride, comprising (1) distilling a mixture of chlorosilanes comprising silicon tetrachloride, trimethylchlorosilane, methyltrichlorosilane, dimethyldichlorosilane, and methyldichlorosilane, where there is utilized by weight in said mixture, 2 parts of methyldichlorosilane per part of silicon tetrachloride, (2) continuously separating as an overhead product, a mixture comprising silicon tetrachloride and methyldichlorosilane, and (3) continuously separating as a bottoms product a mixture containing trimethylchlorosilane, methyltrichlorosilane, and dimethyldichlorosilane.

References Cited in the file of this patent

UNITED STATES PATENTS

| 2,388,575 | Sauer et al. | Nov. 6, 1945 |
| 2,519,926 | Patnode et al. | Aug. 22, 1950 |
| 2,563,557 | Schubert et al. | Aug. 7, 1951 |
| 3,007,956 | Linville et al. | Nov. 7, 1961 |
| 3,034,969 | Makin | May 15, 1962 |

OTHER REFERENCES

Doklady Akademii Nauk SSSR, Shakhparonov et al., vol. 133, 1960 (pages 1388–90).